United States Patent [19]

Stalego

[11] 4,113,457
[45] Sep. 12, 1978

[54] APPARATUS FOR SUPPLYING GLASS BODIES TO GLASS MELTERS

[75] Inventor: Charles J. Stalego, Newark, Ohio

[73] Assignee: Owens-Corning Fiberglas Corporation, Toledo, Ohio

[21] Appl. No.: 758,109

[22] Filed: Jan. 10, 1977

[51] Int. Cl.² ............................................. C03B 37/02
[52] U.S. Cl. ................................. 65/11 R; 65/11 W; 65/335; 222/527
[58] Field of Search .................. 65/1, 2, 11 R, 11 W, 65/335; 222/527

[56] References Cited

U.S. PATENT DOCUMENTS

| 3,129,084 | 4/1964 | Labino | 65/2 |
| 3,479,167 | 11/1969 | Ashman | 65/11 W |
| 3,867,117 | 2/1975 | Bebart | 65/11 W X |

FOREIGN PATENT DOCUMENTS 482,401  12/1975  U.S.S.R. ................................. 65/11 R

Primary Examiner—Robert L. Lindsay, Jr.
Attorney, Agent, or Firm—Ronald C. Hudgens; Philip R. Cloutier; Ted C. Gillespie

[57] ABSTRACT

Apparatus is provided for supplying glass to glass melters, the glass specifically being glass bodies in the form of marbles or balls. The marbles are fed by gravity from a hopper to melting units therebelow through flexible supply chutes. Between the hopper and the supply chutes are ejector chutes for ejecting pieces of broken marbles prior to reaching the flexible supply chutes, to avoid jamming therein. The ejector chute has at least one elongate opening extending the length thereof and of a size to pass through broken marbles.

6 Claims, 6 Drawing Figures

APPARATUS FOR SUPPLYING GLASS BODIES TO GLASS MELTERS

This invention relates to apparatus for supplying glass from a hopper to a glass melting unit, the glass being in the form of marbles or balls.

Glass fibers or filaments are commonly made from streams of molten glass attenuated from orifices in the bottom of an electrically-heated melting unit or bushing. One common technique for producing glass fibers is known as a marble melt process which involves supplying preformed, spherically-shaped bodies of glass, known in the art as marbles, to a unit for melting and conditioning the glass. The molten glass flows in streams through the orifices and the streams are attenuated into filaments or fibers. A plurality of the melting units are commonly used, with several of them being supplied with the glass marbles from a common supply source or hopper.

The marbles used as the glass supply for the melting unit are made in large quantities by marble making-machines and are typically supplied to the location of the marble melting units in three thousand pound barrels. The marbles are then transferred from the barrels to the hoppers which can contain nine hundred pounds of marbles and from there are supplied to the plurality of marble melting units fed by each hopper. The marbles are also usually "graded" prior to being placed in the hopper. Through the handling of the marbles, breakage sometimes results. Further, the marbles will sometimes break in the hopper as they are slightly agitated therein when being fed downwardly therethrough to the bushings. This is particularly true if the marbles are not properly annealed. The fracture of the marble usually occurs after the marbles are scratched which can occur when they are in contact with one another. When the marbles do fracture, they usually do so near the center, with the smaller part of the fractured marble seldom being less than one quarter of it. Stated another way, the marbles usually fracture into two parts, with the two parts usually being in a ratio between one-fourth to three-fourths and one-half to one-half.

The marbles are fed through separate flexible supply chutes from the hopper to the melting units. The flexibility of the supply chutes facilitates the installation of the overall-forming system since each chute can be positioned around auxiliary equipment and supports which the chutes must circumvent in establishing continuous paths from the hopper to the melting units.

One type of flexible supply chute which has heretofore been employed has been made of steel springs or coils of wire, as disclosed in a U.S. Pat. No. 3,867,117 to J. A. Bebart. The springs formed a continuous, flexible supply chute with the openings between the adjacent coils being about one-eighth inch when marbles with one inch diameter were employed. The springs would tend to vibrate as the marbles moved down the chutes and the agitation would aid in moving broken marbles through the chutes. However, on occasion, marble pieces would tend to be caught between the adjacent coils of the wire.

The present invention provides an ejector chute designed to be positioned between the hopper and the flexible supply chute to eject marble pieces prior to entering the supply chute. The ejector chute has at least one elongate opening having a width somewhat smaller than the nominal diameter of the marbles to be employed. This enables broken marble pieces to pass through and yet prevents the smallest size whole marble to be encountered from passing through. In a preferred form, the opening extends in a spiral from one end of the chute to the other with the width being measured from a point on one edge of the opening perpendicularly across to a point on the other edge of the opening. In a further preferred form, the ejector chute is made from at least one spiral wire which forms the chute and extends from one end to the other. More than one such wire can be employed, up to four having been found to be satisfactory, with the greater the number of wires, the greater the pitch thereof to provide the proper width of the openings or spacing between adjacent wires. Additional short wires or prongs can be employed between the main ones at the bottom of the chute; these have been found to substantially prevent the possibility of marbles jamming at the point where they are about to enter the supply chute.

Also in a preferred form, the discharge end of the ejector chute can have an elbow therein with an opening in the outer surface of the elbow through which access can be had to marbles passing through to the supply chute to free any possible jamming in the supply chute or the melting unit.

It is, therefore, a principal object of the invention to provide supply means for supplying glass marbles from a hopper to a melting unit with less jamming resulting therebetween.

Another object of the invention is to provide an ejector chute between a marble hopper and a supply chute having openings through which marble pieces can be ejected prior to entering the supply chute.

A further object of the invention is to provide a glass filament forming system including a hopper and a melting unit with supply means therebetween including a flexible supply chute and an ejector chute for ejecting marble pieces prior to entering the supply chute.

Yet another object of the invention is to provide an ejector chute for removing broken glass marbles passing therethrough, which chute is made from at least one spiral wire forming at least one spiral opening extending from one end of the chute to the other.

Many other objects and advantages of the invention will be apparent from the following detailed description of preferred embodiments thereof, reference being made to the accompanying drawings, in which.

Figure 2:
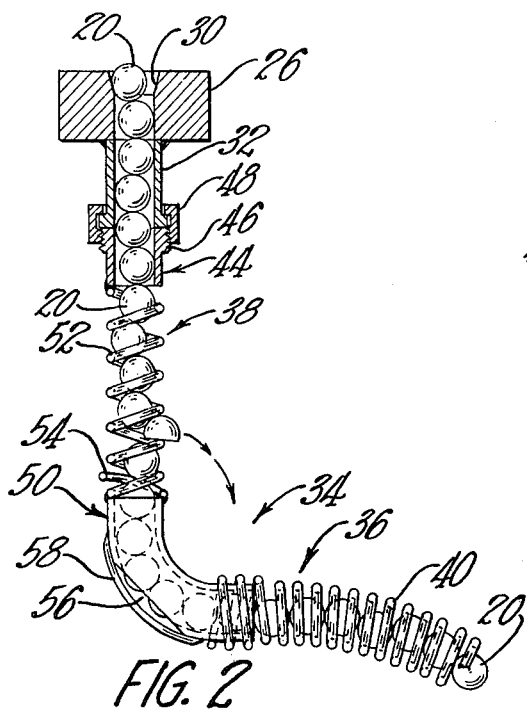
FIG. 2 is an enlarged view in elevation, with parts in section, of a portion of the supply means, including the ejector chute, of FIG. 1.

While the invention is described in connection with a glass filament forming process, it will be evident that the invention can be employed with other glass melting units and is also applicable to other processes in which thermoplastic or other heat-softenable material is supplied to a melter in the form of marbles or balls.

illustrated in FIG. 2), thereby altering the optical alignment of the gyro laser optics.

The application of a control voltage across terminals A and B of the second terminal pair provides a symmetrical voltage gradient across laminate 32, 33, resulting in a translationally induced displacement (as illustrated in FIG. 2), thereby altering the optical path length of the gyro laser optics. The combined effect of the concomitant application of exemplary control voltages to both of control terminal pairs AB and CD is both a translational (vertical) and angular displacement, illustrated by the exemplary dotted phantom lines in FIG. 2 as $X_1$ (upward) and $\theta_1$ (clockwise). However, any combination of directions (up/down, clockwise/counterclockwise) may be realized, including alternating senses and amplitudes from the application of a-c control signals to terminal pairs AB and CD in the arrangement of FIG. 1.

Referring again to FIG. 1, there is also provided a source 13 of two frequency-coded phase reference signals $f_1$ and $f_2$. A first and second synchronous detector 14 and 15 are commonly responsively coupled (by blocking capacitor 16) to the output of photodetector 12, each synchronous detector further having a reference input responsive to a mutually exclusive one of coded reference signals $f_1$ and $f_2$. A first differential signalling means 18 responsive to first reference signal $f_1$ and an output of first synchronous detector 14, provides a control signal output to first control mode terminal pair AB, while second differential signalling means 19 responsive to second reference signal $f_2$ and an output of second synchronous detector 15 provides a control signal output to second control mode terminal CD.

In normal operation of the above-described arrangement, the separately applied frequency coded signals $f_1$ and $f_2$ serve to separately modulate separate modes of duo-mode bimorph element 11, frequency $f_1$ being applied to terminal pair AB (via amplifier 18) to dither or modulate the path length or translational control mode, while the application of frequency $f_2$ to terminal pair CD (via amplifier 19) serves to dither or modulate the alignment or angular control mode. Such modulations of the laser cavity optics, as detected by element 12, are coupled to both of demodulators 14 and 15 by blocking capacitor 16. Separation of or discrimination between the two detected modulations is effected by phase modulators 14 and 15; demodulator 14 employing the reference signal $f_1$ as a phase reference to distinguish or phase-detect the translational-associated modulations at frequency $f_1$, while demodulator 15 employs the reference signal $f_2$ as a phase reference to distinguish or phase detect the angular displacement-associated modulations at frequency $f_2$. Low-pass filtering of the demodulator output attenuates signal effects due to heterodyning or mixing of the $f_1$ and $f_2$ frequency signals.

Each of differential amplifiers 18 and 19 serve as negative feedback devices for closed loop control of a respective one of the translational (or path length) and angular (or alignment) control modes. First amplifier 18 combines the phase-detected (bipolar analog) output of demodulator 14 with the $f_1$ dither reference output from signal generator 13 for control of the displacement mode of duo-mode bimorph element 11, so as to reduce the bimorph deviation from a preferred or optimum displacement operating condition $\overline{A}_{0\theta}$ (see FIG. 3). Similarly, second amplifier 19 combines the phase-detected output of demodulator 15 with the $f_2$ dither reference output from generator 13 for control of the alignment mode of bimorph element 11 so as to adjust the demodulator output in such a sense as to reduce the deviation from a preferred alignment operating condition $A_{x,o}$ in FIG. 3.

In a precision laser gyro, it is important to operate the optical frequency of the counter rotating beams nominally at the center of the intensity spectrum. If the beam frequency is changed relative to the frequency at peak intensity, the beam frequencies change with respect to each other and cause a gyro bias change. A change in path length will cause a change in beam frequency. My active servo control system is used to sense the peak intensity and control the path length to continuously maintain the beam frequency at a value corresponding to the frequency at maximum intensity.

In a precision laser gyro, it is also important to maintain constant loss in the beams to achieve good bias stability. A mirror alignment change with respect to the aperture will cause a loss change which results in a beam intensity change. My active servo control loop, being integral with the path length servo, is used to sense the peak intensity and control the mirror alignment about a first axis parallel to the opposite beam leg to continuously maintain beam alignment. Gyro bias change caused by mirror alignment change about a second axis normal to the plane of the beam is reduced to 30 times smaller than about the above-noted first axis. Therefore, active mirror alignment need be used only in one axis to achieve the required alignment stability.

The maximum beam intensity is held constant by a constant plasma excitation current, as is understood in the art, while the beam alignment control of the invention holds the beam alignment to an average intensity condition corresponding to such maximum intensity.

In a representative laser gyro design, bias sensitivity to path length change is typically 0.1 o/hr. per micro inch change in path length. A bias change of less than 0.1 o/hr. caused by path length change requires the path length to change less than 0.08 micro inches, which could be caused by a mirror face moving in a direction normal to its face by only 0.05 micro inches. The bias sensitivity to mirror alignment in its most critical axis (axis controlled) is typically 1.5 o/hr./sec. To hold a bias change to less than 0.1 o/hr. resulting from beam alignment would normally require mirror angles to be stable to better than 0.007 sec. If the optical cavity has its dimensions changed by creep or as a result of temperature changes, both the path length and beam alignment can change and such tolerances cannot normally be achieved (in the absence of my invention). Temperature transients are most apparent at warm-up conditions, creep more apparent between different start-ups. In either case of such environment-induced disturbance, my active path length and beam alignment control system detects a change in the relationship between the operating path length and alignment with respect to the maximum intensity, and applies an equal and opposite correction to the path length and beam alignment by compensatorily translating and rotating the diaphragm mirror to return the operating condition to that of maximum intensity.

Figure 1:
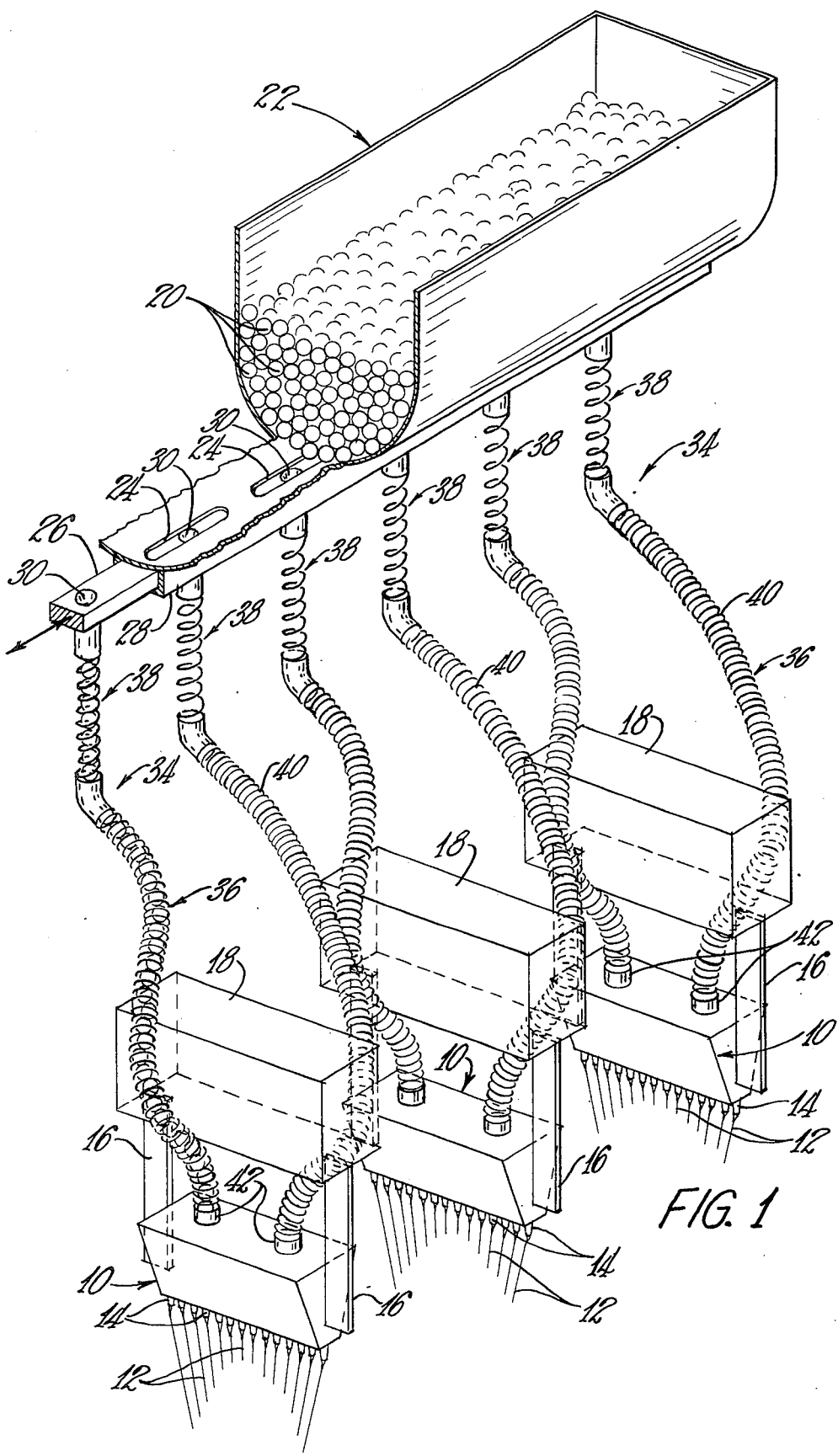
FIG. 1 is a somewhat schematic view in perspective, with parts broken away and with parts in section, of a filament forming system, including a marble hopper, melting units, and supply means therebetween including ejector chutes embodying the invention.
Figure 3:
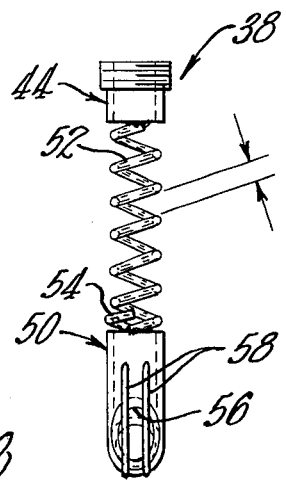
FIG. 3 is a left side view of the ejector chute of FIG. 2.

Accordingly, the control arrangement of FIG. 1 serves to control the amplitude A of the lasing condition of the gyro laser cavity to the optimum state represented in FIG. 3 as $A_{00}$.

Thus, it is to be appreciated that there has been described improved dual-mode control means for consmallest marble expected to be encountered for marbles of any given nominal diameter. This spacing enables the proper ejection of marble pieces which tend to be squeezed through the transverse opening by whole marbles on each side thereof (FIG. 2). Marble pieces too large to pass through the opening are sufficiently round to move satisfactorily through the supply chute 36.

An additional helical or spiral member or prong 54 is located at the lower end of the elongate member 52. The prong 54 is affixed to the upper end of the discharge connection 50 and extends, in this instance, through half of a turn, having the same pitch as the member 52. This, then, reduces te width of the opening at the lower end of the chute to about half of the rest of the spiral opening thereabove. The prong helps in guiding the whole marbles to the center of the bore of the chute 38 and specifically the bore of the discharge connection 50. This is particularly effective for very small or deformed marbles which otherwise may jam at the top of the connection 50.

The discharge connection 50 is in the form of a 90° elbow with the wire 40 of the supply chute 36 received over the lower end of the connection and suitably affixed thereto, again as by welding. The outer surface of the elbow 50 has an elongate opening 56 formed therein with two curved bars 58 extending thereover. The bars 58 prevent the possibility of the marbles 20 passing through the opening 56 while the opening 56 still is sufficiently large to provide access by an operator particularly to marbles in the chute 36. In the event that jamming might occur in the supply chute 36 or in the upper portion of the melting unit 10, the operator can then push on the marbles entering the supply chute 36 and clear the jam. Also, smaller pieces of marble not discharged through the spiral opening of the ejector chute 38 can be ejected between the bars 58.

Figures 4, 5, 6:
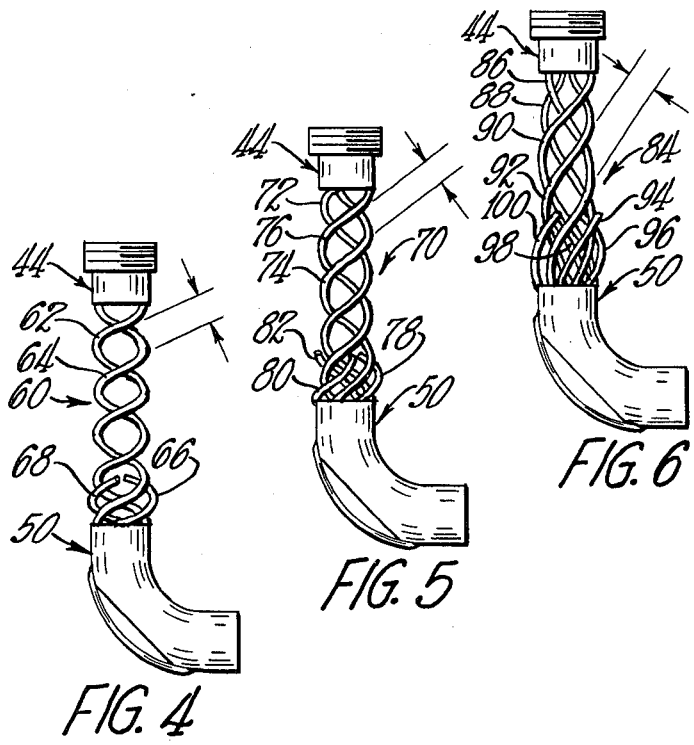
FIG. 4 is a side view in elevation of a slightly modified ejector chute embodying the invention.
FIG. 5 is a side view in elevation of another slightly modified ejector chute embodying the invention.
FIG. 6 is a side view in elevation of a further modified ejector chute embodying the invention.

A slightly modified ejector chute 60 is shown in FIG. 4. The ejector chute 60 includes the entrance connection 44 and the discharge connection 50. In this instance, two spiral or helical members or wires 62 and 64 form two transverse or spiral openings over the length of the ejector chute 60 between the entrance and discharge ends. The width of the openings is then measured between adjacent turns of the wires 62 and 64 with the width of the opening being roughly half the pitch of each of the wires 62 and 64. Two prongs 66 and 68 are located at the lower end of the chute, being affixed to the upper end of the discharge connection 50 and reducing the width of the openings at the lower end to one-half of the openings thereabove. Each of the prongs 66 and 68 extends about one-half turn and they serve the same purpose as the prong 54 of the chute 38.

An ejector chute 70 of FIG. 5 is similar to the chute 60 but has three spiral or helical members or wires 72, 74, and 76 extending the length of the chute 70 between the entrance and discharge connections. Three spiral openings are formed by the three members in this instance, with the width of each opening being the same as the width of the openings of the chutes 38 and 60, being roughly equal to one-third the pitch of each of the members 72–76. Three prongs 78, 80, and 82 are affixed to the discharge connection 50 and extend upwardly therefrom again to reduce the width of the openings at the lower end of the chute to about one-half that of the upper portions of the openings. In this instance, each of the prongs extends through about one-third of a turn of the members 72–76.

An ejector chute 84 of FIG. 6 includes the entrance and discharge connections 44 and 50, as before. In this instance, four spiral or helical members or wires 86, 88, 90, and 92 form four elongate or spiral openings between the ends of the chute 84. The openings again have widths the same as those of the chutes 70, 60, and 38 which, in this instance, are equal to about one-fourth of the pitch of the members 86–92. Four prongs 94, 96, 98, and 100 extend upwardly from the upper end of the discharge connection 50 and again reduce the width of the lower portions of the spiral openings to about one-half of that of the upper portions of the openings. The prongs 94–100, in this instance, extend only about one-fourth of a turn of the wires 86–92.

It will be noted that in all instances the wires or elongate members of the discharge chute are parallel and equally spaced to form openings of uniform width throughout the length of the chutes. While all of the chutes discussed above have performed satisfactorily, the low or small pitch of the helical member 52 of the chute 38 sometimes tends to cause a broken marble to wedge between the adjacent turns which is less apt to occur with the longer pitch of the members of the chutes of FIGS. 4–6.

It will be readily understood that the pitch of the wires and the widths of the openings and the bore of the ejector chute can be changed by moving the entrance connection 44 and the discharge connection 50 toward and away from one another. Also, twisting of the one connection relative to the other can similarly change the opening width and increase or decrease the bore of the ejector chute.

Various modifications of the above-described embodiments of the invention will be apparent to those skilled in the art and it is to be understood that such modifications can be made without departing from the scope an the invention, if they are within the spirit and the tenor of the accompanying claims.

I claim:

1. Apparatus for producing glass filaments comprising a marble hopper, a bushing, and means for feeding glass marbles sequentially from said hopper to said bushing, said bushing comprising means for melting the glass marbles and means for attenuating the molten glass into filaments, said feeding means comprising a conduit for generally spherical objects comprising a plurality of substantially coaxial helically wound wires, the wires being spaced apart by an ejector opening.

2. The apparatus of claim 1 in which said ejector opening extends substantially along the entire length of said conduit.

3. The apparatus of claim 2 in which said ejector opening has a width within the range of from about 65 to about 90% of the smallest diameter marbles expected to be encountered for a given nominal diameter of marbles.

4. The apparatus of claim 1 comprising an additional short wire positioned at the bottom of said conduit within said ejector opening.

5. The apparatus of claim 1 comprising an elbow surrounding a portion of said conduit, said elbow having an access opening.

6. The apparatus of claim 5 in which said access opening does not exceed the width of said ejector opening.

* * * * *